United States Patent
Ouchi et al.

(10) Patent No.: US 9,154,848 B2
(45) Date of Patent: Oct. 6, 2015

(54) TELEVISION APPARATUS AND A REMOTE OPERATION APPARATUS

(75) Inventors: Kazushige Ouchi, Saitama-ken (JP);
Akinori Kawamura, Tokyo (JP);
Masaru Sakai, Kanagawa-ken (JP);
Kaoru Suzuki, Kanagawa-ken (JP);
Yusuke Kida, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 130 days.

(21) Appl. No.: 13/236,001

(22) Filed: Sep. 19, 2011

(65) Prior Publication Data

US 2012/0226502 A1 Sep. 6, 2012

(30) Foreign Application Priority Data

Mar. 1, 2011 (JP) ................ P2011-044430

(51) Int. Cl.
*G10L 21/00* (2013.01)
*G10L 15/26* (2006.01)
(Continued)

(52) U.S. Cl.
CPC ............ *H04N 21/4882* (2013.01); *G10L 15/26* (2013.01); *H04N 5/4403* (2013.01); *H04N 5/52* (2013.01); *H04N 5/60* (2013.01); *H04N 21/42203* (2013.01); *H04N 21/439* (2013.01); *H04N 21/4325* (2013.01); *H04N 21/4334* (2013.01); *H04N 21/4394* (2013.01); *H04N 21/47* (2013.01); *H04N 21/42222* (2013.01); *H04N 2005/4432* (2013.01)

(58) Field of Classification Search
CPC ........ G10L 21/00; G10L 15/265; H04N 5/52; H04N 2005/4432; H04N 5/60
USPC .......... 704/226, 231, 251, 275, 245; 379/102; 386/248; 348/13.03, 14.03, 461
See application file for complete search history.

(56) References Cited

U.S. PATENT DOCUMENTS 5,987,106 A * 11/1999 Kitamura ................. 379/110.01
6,396,544 B1 * 5/2002 Schindler et al. ............. 348/461
(Continued)

FOREIGN PATENT DOCUMENTS

JP 03-203796 9/1991
JP 11-015494 1/1999
(Continued)

OTHER PUBLICATIONS

Office Action of Notice of Reasons for Refusal for Japanese Patent Application No. 2011-044430 Dated Oct. 17, 2014, 6 pages.

*Primary Examiner* — Pierre-Louis Desir
*Assistant Examiner* — Seong-Ah A. Shin
(74) *Attorney, Agent, or Firm* — Amin, Turocy & Watson, LLP

(57) ABSTRACT

According to one embodiment, a television apparatus includes a speech input unit, an indication input unit, a speech recognition unit, and a control unit. The speech input unit is configured to input a speech. The indication input unit is configured to input an indication to start speech recognition from a user. The speech recognition unit is configured to recognize the user's speech inputted after the indication is inputted. The control unit is configured to execute an operation command corresponding to a recognition result of the user's speech. The control unit, if a volume of the television apparatus at a timing when the indication is inputted is larger than or equal to a threshold, temporarily sets the volume to a value smaller than the threshold while the speech recognition unit is recognizing.

6 Claims, 16 Drawing Sheets

(51) Int. Cl.
*H04N 21/00* (2011.01)
*H04N 5/60* (2006.01)
*H04N 21/488* (2011.01)
*H04N 5/44* (2011.01)
*H04N 5/52* (2006.01)
*H04N 21/422* (2011.01)
*H04N 21/432* (2011.01)
*H04N 21/433* (2011.01)
*H04N 21/439* (2011.01)
*H04N 21/47* (2011.01)

(56) References Cited

U.S. PATENT DOCUMENTS

| | | | |
|---|---|---|---|
| 6,665,645 B1* | 12/2003 | Ibaraki et al. | 704/275 |
| 7,023,498 B2* | 4/2006 | Ishihara | 348/734 |
| 7,272,232 B1* | 9/2007 | Donaldson et al. | 381/55 |
| 8,106,750 B2* | 1/2012 | Cho et al. | 340/12.5 |
| 8,165,641 B2* | 4/2012 | Koike et al. | 455/567 |
| 8,187,093 B2* | 5/2012 | Hideya | 463/32 |
| 8,212,707 B2* | 7/2012 | Haga et al. | 341/176 |
| 2005/0043948 A1* | 2/2005 | Kashihara et al. | 704/242 |
| 2007/0050832 A1* | 3/2007 | Wright et al. | 725/115 |
| 2009/0148135 A1* | 6/2009 | Ishino et al. | 386/124 |
| 2010/0076763 A1 | 3/2010 | Ouchi et al. | |
| 2010/0333163 A1* | 12/2010 | Daly | 725/133 |
| 2011/0051016 A1* | 3/2011 | Malode | 348/734 |
| 2011/0091031 A1 | 4/2011 | Taniguchi et al. | |
| 2011/0301950 A1 | 12/2011 | Ouchi et al. | |
| 2012/0162540 A1* | 6/2012 | Ouchi et al. | 348/734 |
| 2012/0245932 A1 | 9/2012 | Ouchi et al. | |

FOREIGN PATENT DOCUMENTS

| | | |
|---|---|---|
| JP | 2001-236090 | 8/2001 |
| JP | 2006-065981 | 3/2006 |
| JP | 2006-119520 | 5/2006 |
| JP | 2009-109536 | 5/2009 |
| WO | 2009-150776 | 12/2009 |
| WO | 2011055410 A1 | 5/2011 |

* cited by examiner

| VOLUME LEVEL AT DETECTION TIMING OF SPEECH RECOGNITION START | VOLUME LEVEL DURING SPEECH RECOGNITION |
|---|---|
| OVER 20 | MUTE |
| UNDER 20 | NO CHANGE |

FIG. 7

| VOLUME LEVEL AT DETECTION TIMING OF SPEECH RECOGNITION START | VOLUME LEVEL DURING SPEECH RECOGNITION |
|---|---|
| OVER 20 | VOLUME 20 |
| UNDER 20 | NO CHANGE |

FIG. 8

| VOLUME LEVEL AT DETECTION TIMING OF SPEECH RECOGNITION START | VOLUME LEVEL DURING SPEECH RECOGNITION |
|---|---|
| OVER 40 | MUTE |
| OVER 20 & UNDER 40 | VOLUME 20 |
| UNDER 20 | NO CHANGE |

FIG. 9

| VOLUME LEVEL AT DETECTION TIMING OF SPEECH RECOGNITION START | VOLUME LEVEL DURING SPEECH RECOGNITION |
|---|---|
| OVER 40 | MUTE |
| OVER 20 & UNDER 40 | 1/2 MUTE |
| UNDER 20 | NO CHANGE |

| CONTENT OF TELEVISION OPERATION | RECOGNITION VOCABULARY (JAPANESE) | RECOGNITION VOCABULARY (ENGLISH) |
|---|---|---|
| CHANNEL 1 | ICCHAN | channel one |
| CHANNEL 1 | ENUECHIKEI | nhk |
| CHANNEL 2 | NICHAN | channel two |
| CHANNEL 2 | KYOIKUTEREBI | etv |
| ... | | |
| UP VOLUME A LITTLE | APPU | up |
| UP VOLUME MORE | APPUAPPU | up up |
| LOWER VOLUME A LITTLE | DAUN | down |
| LOWER VOLUME MORE | DAUNDAUN | down down |
| SET VOLUME TO SMALL VALUE (SPECIFIC VALUE) | CHIISAME | low |
| SET VOLUME TO MIDDLE VALUE (SPECIFIC VALUE) | FUTSUU | medium |
| SET VOLUME TO LARGE VALUE (SPECIFIC VALUE) | OOKIME | loud |
| MUTE | MYUTO | mute |
| ... | | |
| POWER OFF | DENGENOFU | turn off |
| POWER OFF | OFU | turn off |
| ... | | |
| SPEECH RECOGNITION MODE-CANCEL | KYANSERU | cancel |

| CONTENT OF TELEVISION OPERATION | RECOGNITION VOCABULARY (JAPANESE) | RECOGNITION VOCABULARY (ENGLISH) |
|---|---|---|
| DISPLAY TODAY'S WEATHER FORECAST | TENKIYOHOU | weather report |
| DISPLAY TODAY'S WEATHER FORECAST | KYONOTENKI | today's weather |
| DISPLAY TOMORROW'S WEATHER FORECAST | ASHITANOTENKI | tomorrow's weather |
| DISPLAY THIS WEEK'S WEATHER FORECAST | KONSYUNOTENKI | this week's weather |
| ... | | |
| DISPLAY SPORTS NEWS | SPOHTSU | sports |
| DISPLAY BASEBALL NEWS | YAKYU | baseball |
| DISPLAY GAME RESULT OF GIANTS | KYOJIN | giants |
| DISPLAY SOCCER NEWS | SAKKAH | soccer |
| ... | | |
| DISPLAY THE PRESENT EXCHANGE RATE | KAWASESOHBA | exchange rate |
| ... | | |
| DISPLAY TIMETABLE OF THE NEAREST BUS STOP | BASU | bus |
| DISPLAY TIMETABLE OF THE NEAREST STATION | DENSYA | train |
| ... | | |
| ... | | |

FIG. 14

TELEVISION APPARATUS AND A REMOTE OPERATION APPARATUS

CROSS-REFERENCE TO RELATED APPLICATION

This application is based upon and claims the benefit of priority from Japanese Patent Application No. 2011-044430, filed on Mar. 1, 2011; the entire contents of which are incorporated herein by reference.

FIELD

Embodiments described herein relate generally to a television apparatus and a remote operation apparatus each operable by a speech.

BACKGROUND

As a conventional technique, a user's utterance is recognized and used for operating a device. If the device (as an operation target) outputs a sound (a broadcasted speech, an artificial speech, and so on), this sound is a noise for recognizing the user's speech. Furthermore, from an input signal mixing the sound (outputted by the device) with a speech uttered by a speaker (user), by using an echo canceller to cancel the sound, a technique to improve an accuracy of speech recognition is proposed. However, in this case, computing processing for the echo canceller is necessary. Accordingly, as to a device having restricted throughput, this technique is difficult to be realized.

On the other hand, a device to mute the sound during recognizing a user's speech is utilized. As to this device, while the user's speech is being recognized, the sound does not exist. Accordingly, the user's speech is recognized without influence of the sound. However, if the device (as the operation target) is a television set, the user (viewer) cannot listen to the sound (speech) broadcasted from the television set during recognizing the speech.

BRIEF DESCRIPTION OF THE DRAWINGS

FIG. 7 is a schematic diagram of a first example of set values to change volume according to the first embodiment.

FIG. 8 is a schematic diagram of a second example of set values to change volume according to the first embodiment.

FIG. 9 is a schematic diagram of a third example of set values to change volume according to the first embodiment.

FIG. 10 is a schematic diagram of a fourth example of set values to change volume according to the first embodiment.

FIG. 13 is a schematic diagram of one example of a correspondence relationship between a speech recognition command and an operation command according to the first embodiment.

FIG. 14 is a schematic diagram of another example of the correspondence relationship between the speech recognition command and the operation command according to the first embodiment.

DETAILED DESCRIPTION

According to one embodiment, a television apparatus includes a speech input unit, an indication input unit, a speech recognition unit, and a control unit. The speech input unit is configured to input a speech. The indication input unit is configured to input an indication to start speech recognition from a user. The speech recognition unit is configured to recognize the user's speech inputted after the indication is inputted. The control unit is configured to execute an operation command corresponding to a recognition result of the user's speech. The control unit, if a volume of the television apparatus at a timing when the indication is inputted is larger than or equal to a threshold, temporarily sets the volume to a value smaller than the threshold while the speech recognition unit is recognizing.

Various embodiments will be described hereinafter with reference to the accompanying drawings.

The First Embodiment

Figure 1:
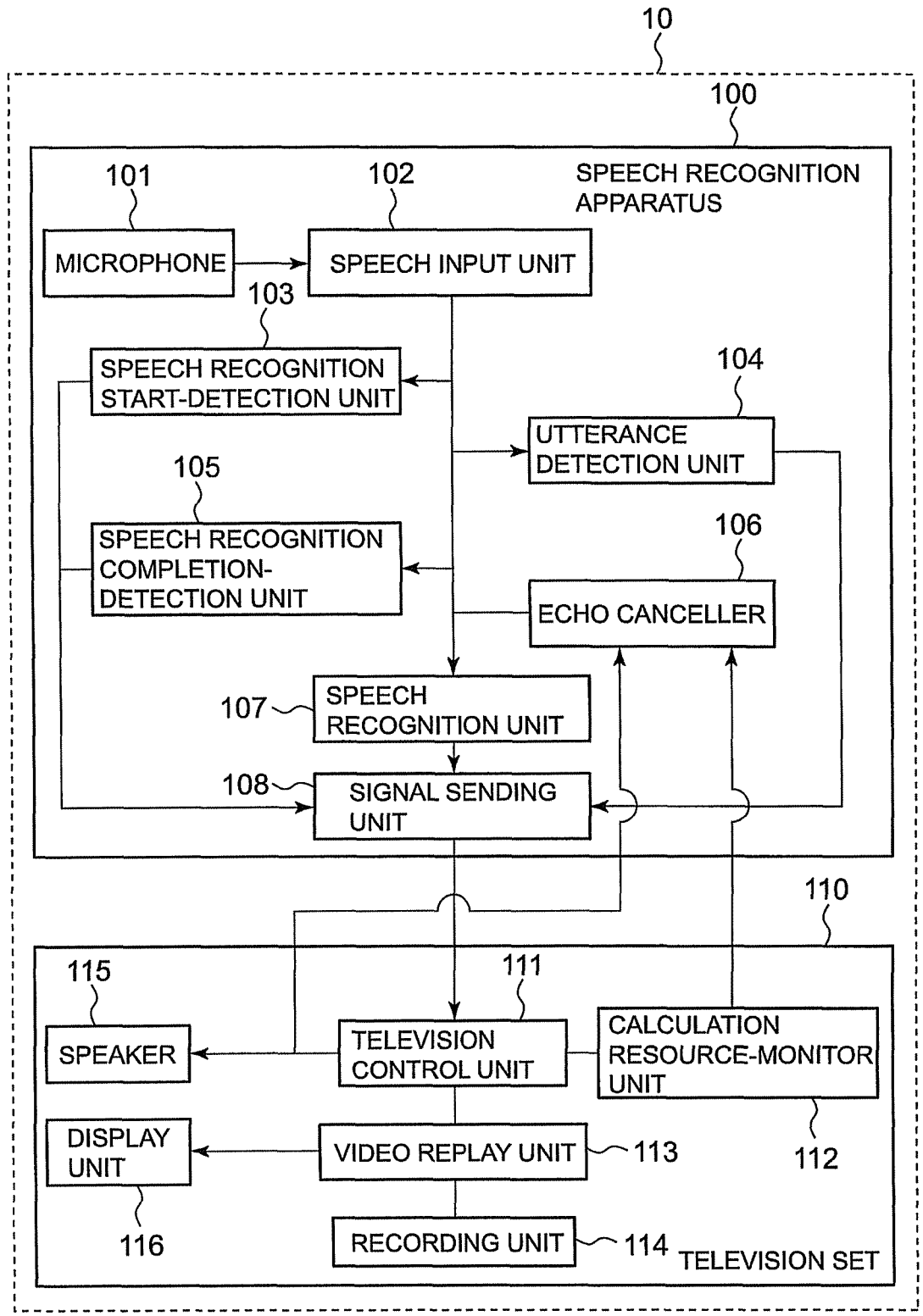
FIG. 1 is a block diagram of a television apparatus according to a first embodiment.

FIG. 1 is a block diagram of a television apparatus 10 of the first embodiment. A user can operate the television apparatus 10 by a speech. The television apparatus 10 includes a speech recognition apparatus 100 and a television set 110. The speech recognition apparatus is integrated into the television set 110, or connected to the television set 110 with wire or radio.

Figure 2:
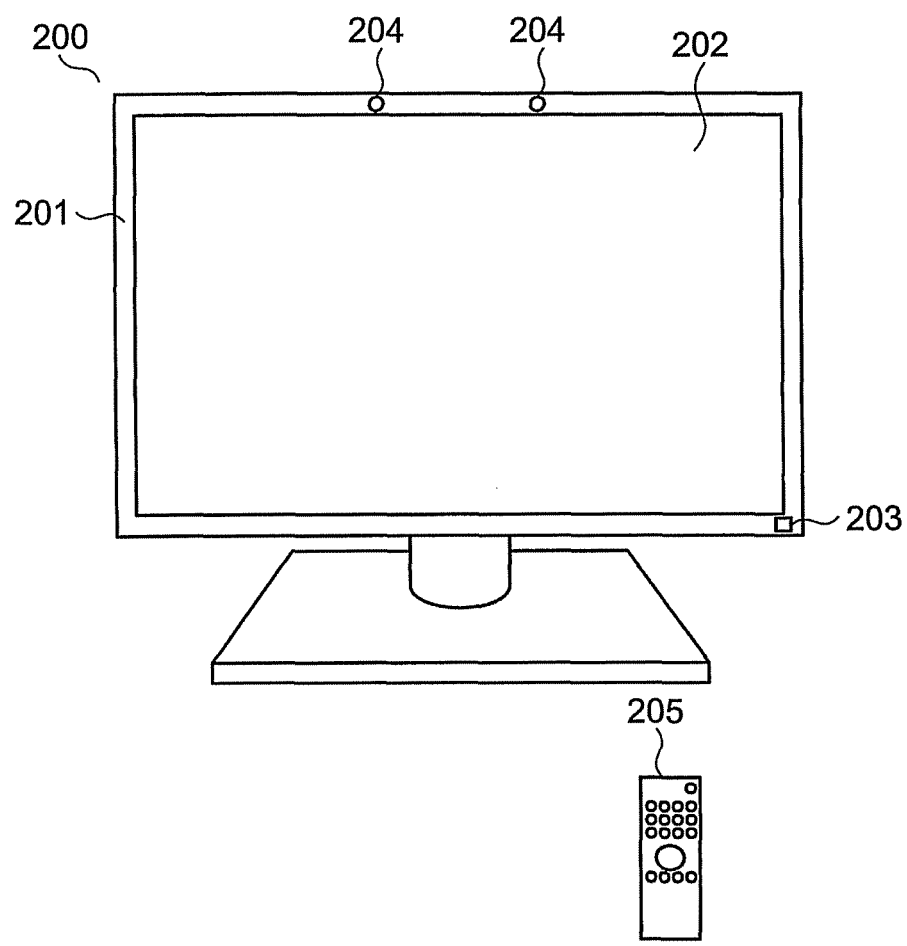
FIG. 2 is a schematic diagram of one example of an appearance of the television apparatus.
Figure 3:
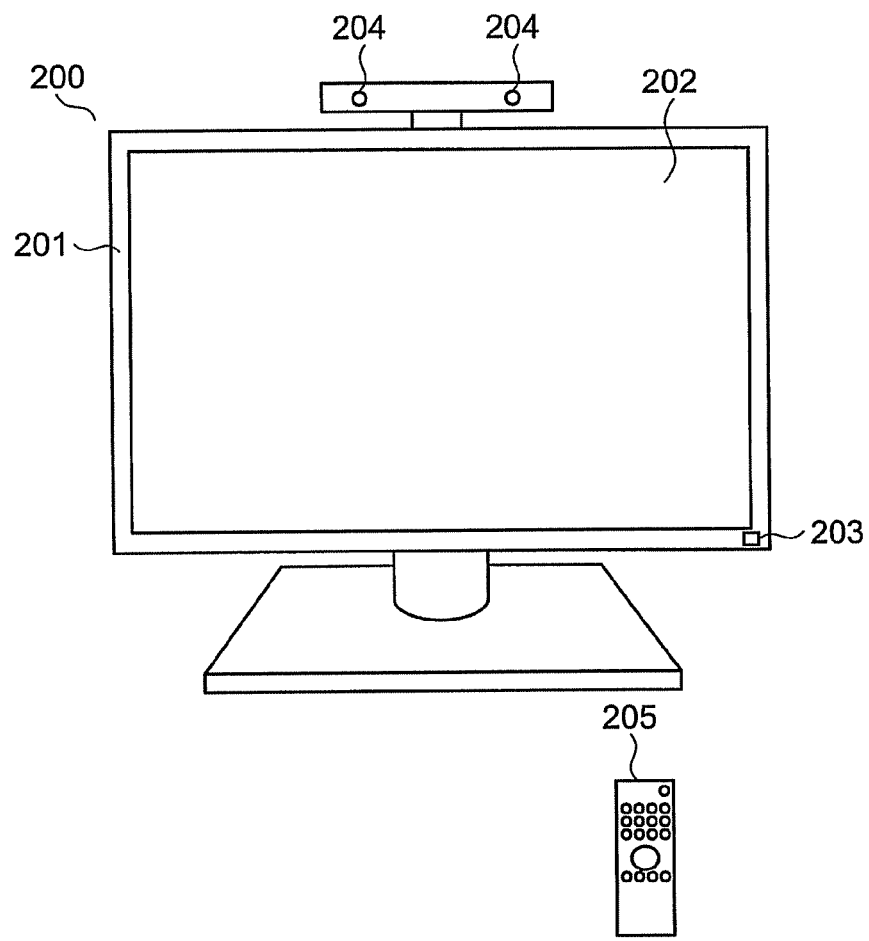
FIG. 3 is a schematic diagram of another example of the appearance of the television apparatus.

FIG. 2 is one example of appearance of the television apparatus 10 when the speech recognition apparatus 100 is integrated into the television set 110. FIG. 3 is one example of appearance of the television apparatus 10 when the speech recognition apparatus 100 is connected to the television set 110 with a cable. In both FIGS. 2 and 3, a component of the television apparatus 10 is shown in FIG. 1. Moreover, in FIGS. 2 and 3, two microphones 204 are provided. However, the number of microphones may be one or larger than two. Furthermore, provided position thereof may be arbitrary.

In the first embodiment, the speech recognition apparatus 100 includes a microphone 101, a speech input unit 102, a speech recognition start-detection unit 103, an utterance detection unit 104, a speech recognition completion-detection unit 105, an echo canceller 106, a speech recognition unit 107, and a signal sending unit 108. The speech input unit 102 inputs a speech from the microphone 101. The speech recognition completion-detection unit 103 detects a predetermined sign to start speech recognition from a user. The utterance detection unit 104 detects existence (or non-existence) of the user's utterance. The speech recognition completion-detection unit 105 detects completion of speech recognition by detecting non-existence. The speech recognition unit 107 recognizes a speech inputted from the speech input unit 102. The signal sending unit 108 sends a predetermined signal based on a speech recognition result. After inputting the user's sign to start speech recognition, the utterance detection unit 104 detects existence (or non-existence) of the user's utterance. As to a speech (sound) outputted from a speaker 115 of the television set 110 and inputted to the speech input unit 102 via the microphone 101, the echo canceller 106 cancels the speech.

The television set 110 includes a television control unit 111, a calculation resource-monitor unit 112, a video replay unit 113, a recording unit 114, a speaker 115, and a display unit 116. The television control unit 111 controls television-volume and executes various operations of television based on signals sent from the signal sending unit 108. The calculation resource-monitor unit 112 monitors a calculation resource of a main processor of the television set 110. The recording unit 114 records a program being broadcasted. The speaker 115 outputs a sound of the program being viewed. The display unit 116 displays a video of the program being viewed. The video replay unit 113 replays a program content being broadcasted, a program content recorded, or a video content recorded in a recording medium. As the recording medium, for example, DVD (Digital Versatile Disc) or BD (Blue-ray Disc) is used.

Figure 4:
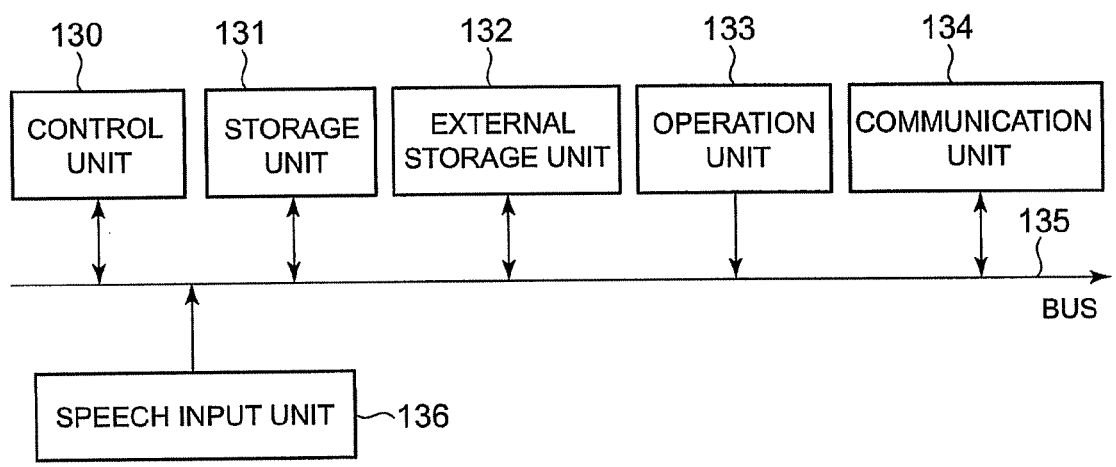
FIG. 4 is a hardware component of the television apparatus.

FIG. 4 is an example of a hardware component of the speech recognition apparatus 100 and the television set 110. The hardware component includes a control unit 130, a storage unit 131, an external storage unit 132, an operation unit 133, a communication unit 134, a bus 135, and a speech input unit 136. The control unit 130 is a CPU (Central Processing Unit) to control all the apparatus. The storage unit 131 is a ROM (Read Only Memory) and a RAM (Random Access Memory) to store various data and various programs. The external storage unit 132 is a HDD (Hard Disk Drive) or a CD (Compact Disk) to store various data and various programs. The operation unit 133 accepts a user's indication input. The communication unit 134 controls communication with an external device. The bus 135 connects above-mentioned units. Furthermore, a speech input unit such as a microphone to input speech is connected to the speech recognition apparatus 100 with wire or radio. Moreover, the hardware component of FIG. 4 is one example. A part or all of the speech recognition apparatus 100 and the television set 110 may be realized as a semiconductor integrated circuit such as LSI or ASIC.

Figure 5:
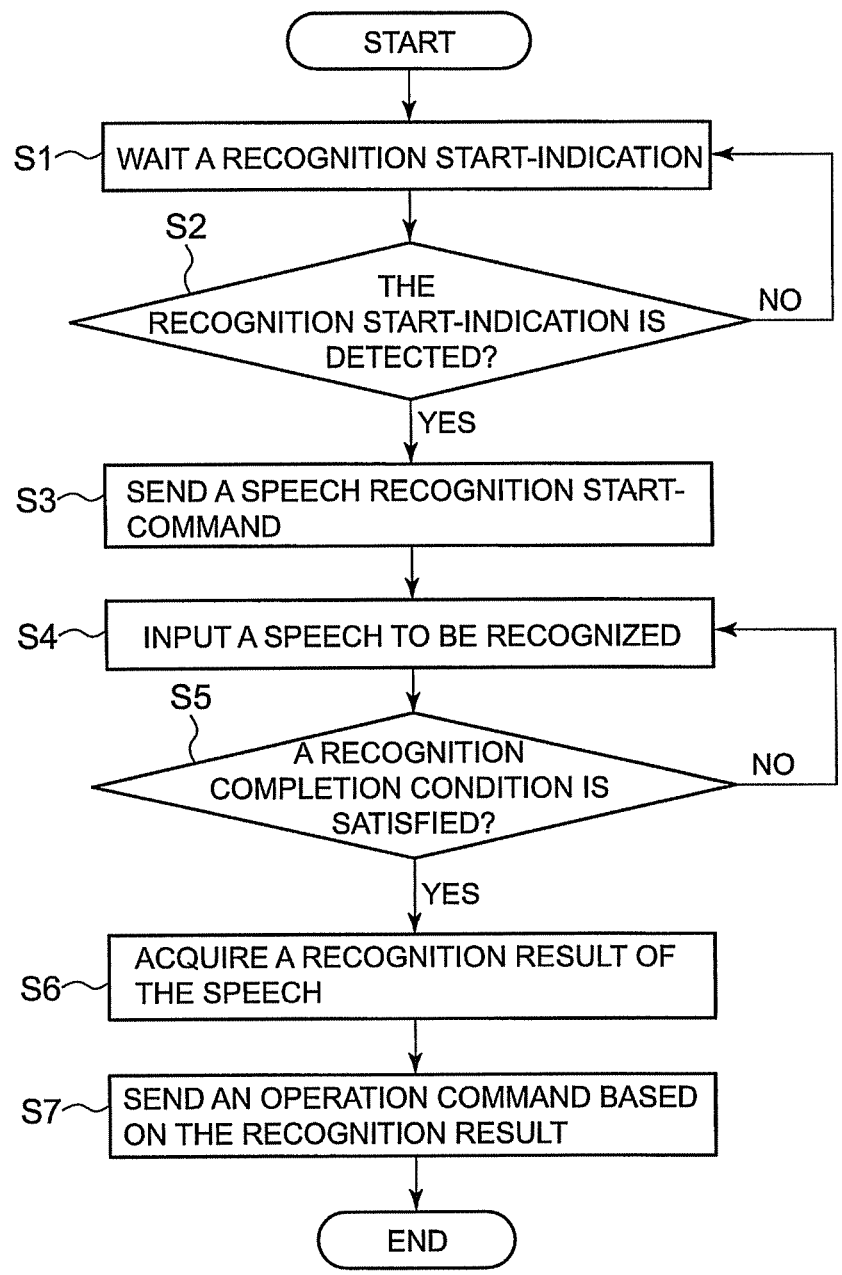
FIG. 5 is a flow chart of processing of a speech recognition apparatus 100 in FIG. 1.
Figure 6:
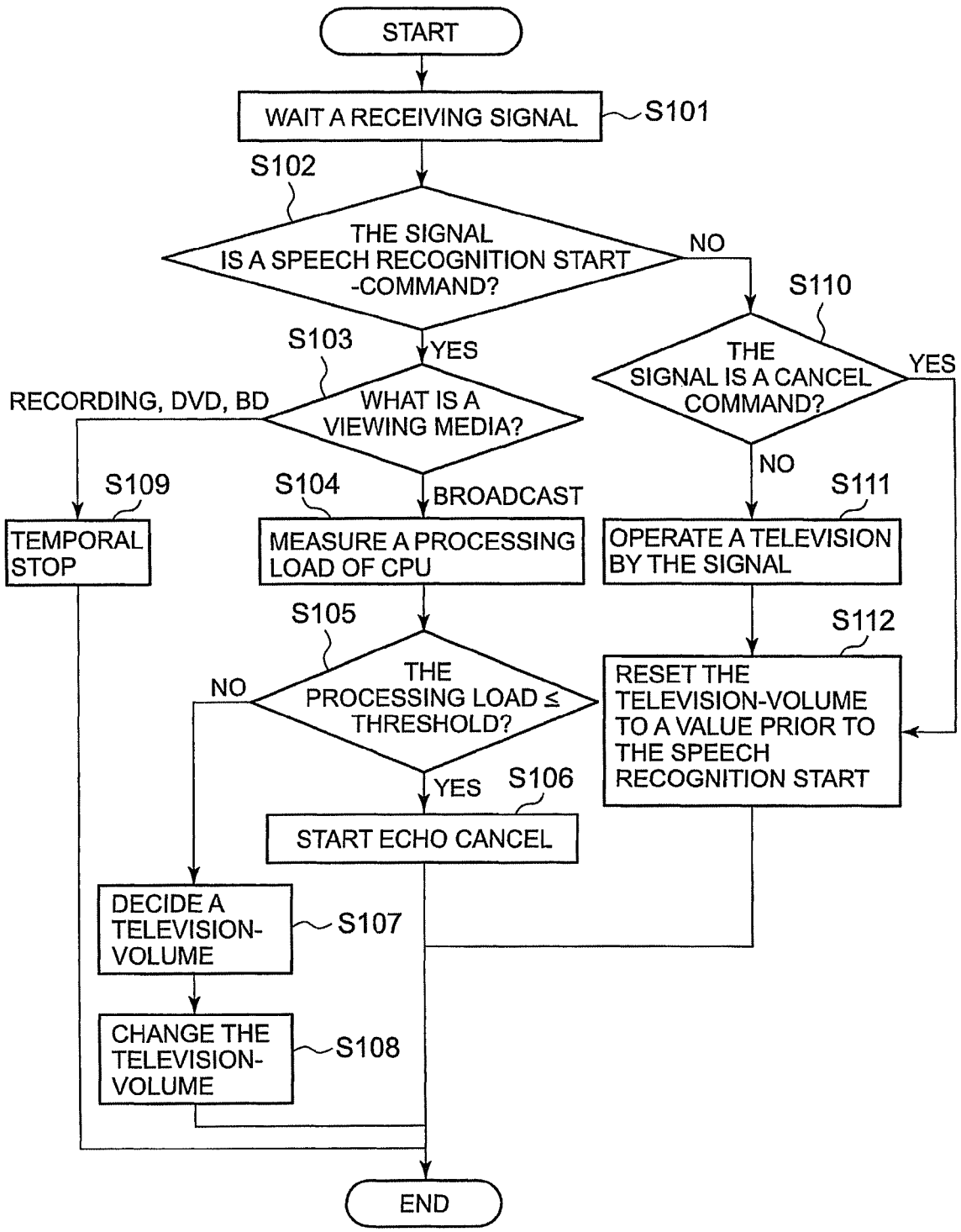
FIG. 6 is a flow chart of processing of a television set 110 in FIG. 1.

FIG. 5 is a flow chart of processing of the speech recognition apparatus 100 according to the first embodiment. FIG. 6 is a flow chart of processing of the television set 110 according to the first embodiment. Next, processing of the speech recognition apparatus 100 and the television set 110 is explained by referring to FIGS. 5 and 6.

First, the speech recognition start-detection unit 103 waits an input of speech recognition start-indication from a user (S1). As the speech recognition start-indication, a predetermined sound is used. For example, by continuously clapping two times with hands, this sound is used as the indication. In this case, from sounds (speeches) inputted to the microphone 101, a clap sound (continuous two claps by hands) is detected.

As another example, a specific word uttered by a user may be used. In this case, a sign-recognition dictionary for recognizing a word used for a sign and a command-recognition dictionary for recognizing a word used for a television operation command are prepared. Regularly, the speech recognition unit 107 performs speech recognition by using the sign-recognition dictionary. When the word of the sign is recognized, the speech recognition unit 107 switches the sign-recognition dictionary to the command-recognition dictionary.

As another example, by providing a speech recognition-start button on a remote controller (in FIGS. 2 and 3), a remote control signal (corresponding to push of the button) received by a remote control receiving unit 203 (in FIGS. 2 and 3) may be used as a sign of speech recognition-start or another sign. Furthermore, one of these signs may be accepted, or the speech recognition-start may be indicated by a plurality of signs.

When the speech recognition start-detection unit 103 detects a sign of speech recognition-start (S2), the signal sending unit 108 sends a speech recognition-start signal to the television control unit 111 of the television set 110 (S3). In this case, in order to feedback start of speech recognition to the user, this purport may be displayed by lighting of a LED (Light Emitting Diode) or an OSD (On-Screen Display).

The television set 110 waits a signal from the signal sending unit 108 of the speech recognition apparatus 100 (S101). When any signal is received from the signal sending unit 108, the television control unit 111 decides whether this signal is a speech recognition start-command (S102). If this signal is the speech recognition start-command, the video replay unit 113 of the television set 110 decides whether a video (being displayed) is a broadcast content or a stored content (S103). The broadcast content is a video broadcasted by digital terrestrial television broadcast, BS digital broadcast, CS digital broadcast, and CATV. The stored content is a program recorded by the recording unit 114 and a video recorded in a media (DVD, BD).

If the video (being viewed) is a broadcast wave, the calculation-monitor unit 112 measures a calculation load of CPU in the control unit 130 of the television set 110 (S104), and decides the calculation load is larger than a predetermined threshold (S105). In this case, this decision may be based on a ratio of the calculation load to all resources of CPU. Furthermore, by defining a calculation quantity of each processing to be executed by the television set 110, the decision may be based on the sum of calculation quantity of processing being presently executed.

By previously examining a calculation quantity required for echo cancel processing, the threshold is determined based on whether the CPU has a performance to execute the echo cancel processing. Accordingly, if a calculation load of the CPU is smaller than the threshold, the CPU has a performance to execute the echo cancel processing. When the calculation load is smaller than the threshold, the echo cancel processing is executed (S106), and the speech recognition unit 107 starts to input a speech signal as a target of speech recognition (S4). In this case, the television control unit 111 does not change the television-volume.

When the calculation load is larger than the threshold, the television control unit 111 reads the present value of television-volume (S107). By deciding whether this value is larger than a predetermined value, operation to change the television-volume is changed. FIGS. 7, 8, 9 and 10 show examples of operations to change the television-volume. Moreover, in FIGS. 7, 8, 9 and 10, the volume becomes larger when a numeral of the volume level is larger.

In FIG. 7, when the volume level is larger than (or equal to) a first threshold, the television control unit 111 mutes the volume. When the volume level is smaller than the first threshold, the television control unit 111 does not change the volume level. Moreover, "not change the volume level" may be said in other words as "keep the volume level".

In FIG. 8, when the volume level is larger than (or equal to) the first threshold, the television control unit 111 sets the volume level to a fixed level. When the volume level is smaller than the first threshold, the television control unit 111 does not change the volume level. For example, when the volume level is larger than (or equal to) "20", the volume level is set to the fixed value (For example, value smaller than "20"). When the volume level is smaller than "20", the volume level is not changed.

In FIG. 9, the first threshold and a second threshold (the first threshold>second threshold) is used. When the volume level is larger than (or equal to) the first threshold, the television control unit 111 mutes the volume. When the volume level is larger than (or equal to) the second threshold and smaller than the first threshold, the television control unit 111 lowers the volume level to a fixed value. When the volume level is smaller than the second threshold, the television control unit 111 does not change the volume level.

In FIG. 10, the first threshold and a second threshold (the first threshold>second threshold) is used. When the volume level is larger than (or equal to) the first threshold, the television control unit 111 mutes the volume. When the volume level is larger than (or equal to) the second threshold and smaller than the first threshold, the television control unit 111 lowers the volume level to a half of the present value. When the volume level is smaller than the second threshold, the television control unit 111 does not change the volume level. For example, when the volume level is larger than (or equal to) "40", the volume is muted. When the volume level is larger than (or equal to) "20" and smaller than "40", the volume is muted as a half value (½). When the volume level is smaller than "20", the volume is not changed. Naturally, another setting may be applied.

In FIGS. 7, 8, 9 and 10, the first threshold "40" and the second threshold "20" are used. However, thresholds are not limited to these values. The first threshold and the second threshold may be changed to another volume level. In general, by executing a performance evaluation of speech recognition in advance, the threshold is arbitrarily set to a level to maintain the performance based on the evaluation result. In above-mentioned example, numerals such as the first threshold "40" and the second threshold "20" are arbitrarily changed based on component/performance of the speech recognition apparatus 100 and the television set 110.

In this way, after executing volume-change based on the television-volume, the speech recognition unit 107 executes input of a speech to be recognized (34).

On the other hand, if the stored content is viewed, the video replay unit 113 temporarily stops a video being replayed (S109), and the speech recognition unit 107 executes input of a speech to be recognized (S4). The stored content is, for example, a program recorded by the recording unit 114, or a video recorded in a medium such as DVD or BD.

Figure 11:
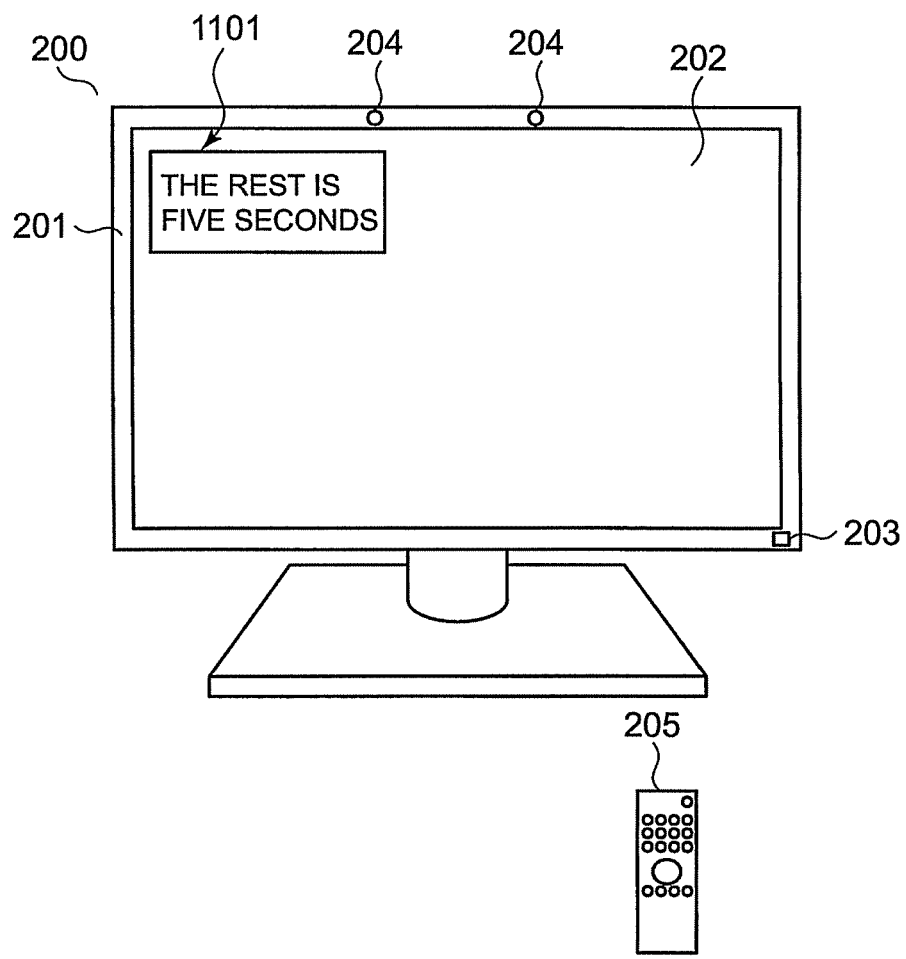
FIG. 11 is a schematic diagram of one example of a display of a remained time to time-out according to the first embodiment.
Figure 12:
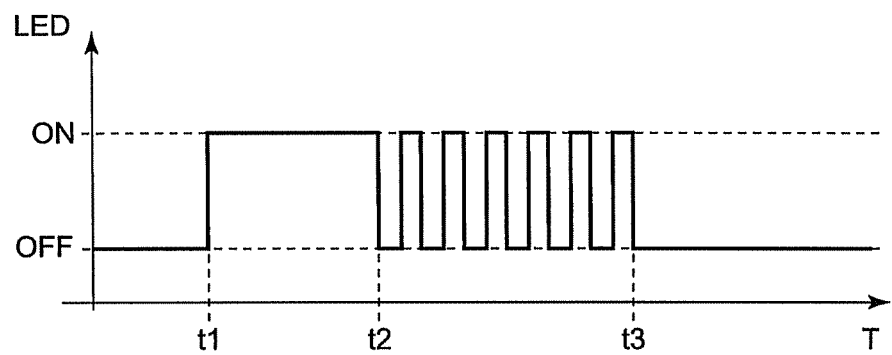
FIG. 12 is a schematic diagram of one of a LED light pattern according to the first embodiment.

The utterance detection unit 104 of the speech recognition apparatus 100 detects whether a user starts to utter. For the case that the user erroneously utters a sign to start speech recognition or the speech recognition start-detection unit 103 erroneously detects the sign, a time-out to automatically return to original status had better be set. Furthermore, as shown in a display 1101 of FIG. 11, the rest time to time-out may be displayed by OSD. Furthermore, as shown in a pattern of FIG. 12, the rest time may be displayed by lighting or blinking a LED. Furthermore, before and after the utterance detection unit 104 detects a user's utterance, LED-blinking or OS-display may be changed. In this case, the user can easily understand whether his/her utterance is accepted. FIG. 12 is one example of status-display by the LED. In a graph of FIG. 12, a horizontal axis represents a time, and a vertical axis represents a status of lighting/blinking. In this example, when a sigh to start speech recognition is detected at timing t1, the LED is lighted. When an utterance is detected at timing t2, the LED is blinked. When the speech recognition is completed at timing t3, the LED is not lighted.

The speech recognition completion-detection unit 105 decides whether the speech recognition is completed (S5). For example, "a silent period continues over a predetermined time" is one condition of speech recognition completion. The speech recognition unit 107 executes speech recognition, and obtains a recognition result of the speech recognition (S6). Based on the recognition result, the signal sending unit 108 sends an operation command of the television set 110 to the television control unit 111 (S7).

In this case, the operation command corresponding to a specific speech command (the recognition result) such as "channel-change", "volume-change", "input-switch" and "screen mode-switch", is sent. Examples of correspondence between the operation command and the speech command are shown in a table 1300 of FIG. 13 and a table 1400 of FIG. 14. For the case that the user erroneously utters a sign to start speech recognition or the speech recognition start-detection unit 103 erroneously detects the sign, a speech command (command 1301 in FIG. 13) to automatically return to the original status had better be set.

When the television set 110 receives an operation command except for the speech recognition start-command (No at S102), the television control unit 111 decides whether the operation command is a cancel command (S110). If the operation command is the cancel command (Yes at S110), the television control unit 111 resets the television-volume to a value prior to the speech recognition start without executing television-operation (S112). If the operation command is not the cancel command (No at S110), the television control unit 111 executes television-operation corresponding to the operation command received (S111), and resets the television-volume to a value prior to the speech recognition start (S112).

As mentioned-above, in the television apparatus of the first embodiment, based on a television-volume prior to the speech recognition start, the television-volume during speech recognition processing is temporarily controlled. As a result, while the speech recognition is accurately executed with little calculation load, disturbance of viewing by the speech operation is avoided.

Furthermore, when the stored content is replayed, this replay is temporarily stopped during the speech recognition. As a result, during operation by the user's speech, viewing of the stored content under incomplete condition is avoided.

The Second Embodiment

Figure 15:
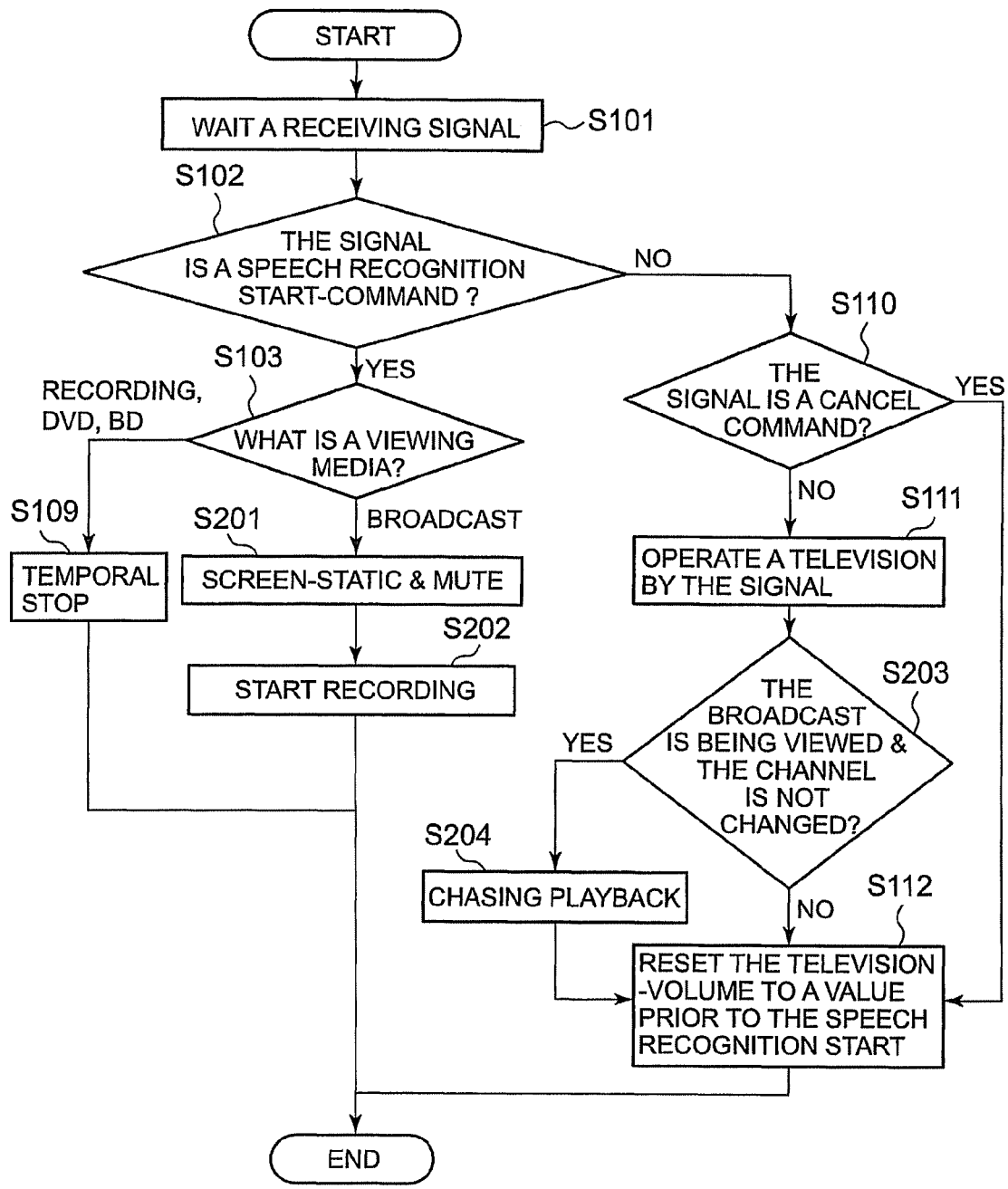
FIG. 15 is a flow chart of processing of the television set 110 according to a second embodiment.

The television apparatus of the second embodiment is explained by referring to Figs. As to the same processing/component as the first embodiment, the same sign is assigned and explanation thereof is omitted, and parts different from the first embodiment are only explained. FIG. 15 is a flow chart of processing of the television set 110 of the second embodiment.

After receiving the speech recognition start-command, the television set 110 changes processing operation based on the present viewing media (S103). If the present viewing media is broadcast, the television control unit 111 makes the screen be static and the sound mute (S201). Afterwards, the recording unit 114 begins to record the program immediately (S202).

After the speech recognition is completed, the television control unit 111 receives an operation command based on a speech recognition result, and executes television operation corresponding to the operation command (S111). The television control unit 111 decides whether following two conditions are satisfied (S203).

(1) The viewing media before starting the speech recognition is broadcast.

(2) The television operation executed by the television control unit 111 is not channel-change of broadcasting wave.

If two conditions (1) and (2) are satisfied, the television control unit 111 starts a chasing playback from the screen at the static timing (S203). Typically, this is the case that operation not channel-change (For example, volume-change) is executed.

On the other hand, if at least one of the two conditions (1) and (2) is not satisfied, the television control unit 111 resets the volume to a value prior to the speech recognition start without the chasing playback (S112). When the recording is executed (S202), and after that, if the viewing-channel is changed, the recording may be stopped. If the recording is stopped, recorded data may be erased.

In the television set of the second embodiment, the speech recognition is executed under a condition that the sound is muted. As a result, the speech recognition can be accurately executed by little calculation cost. Furthermore, a broadcast content during the speech recognition is recorded, and, after the speech recognition, the broadcast content is replayed by chasing. As a result, even if a user operates the television by his/her speech, the user's viewing is not disturbed.

The Third Embodiment

The television apparatus of the third embodiment is explained by referring to Figs. As to the same processing/component as the first and second embodiments, the same sign is assigned and explanation thereof is omitted, and parts different from the first and second embodiments are only explained.

Figure 16:
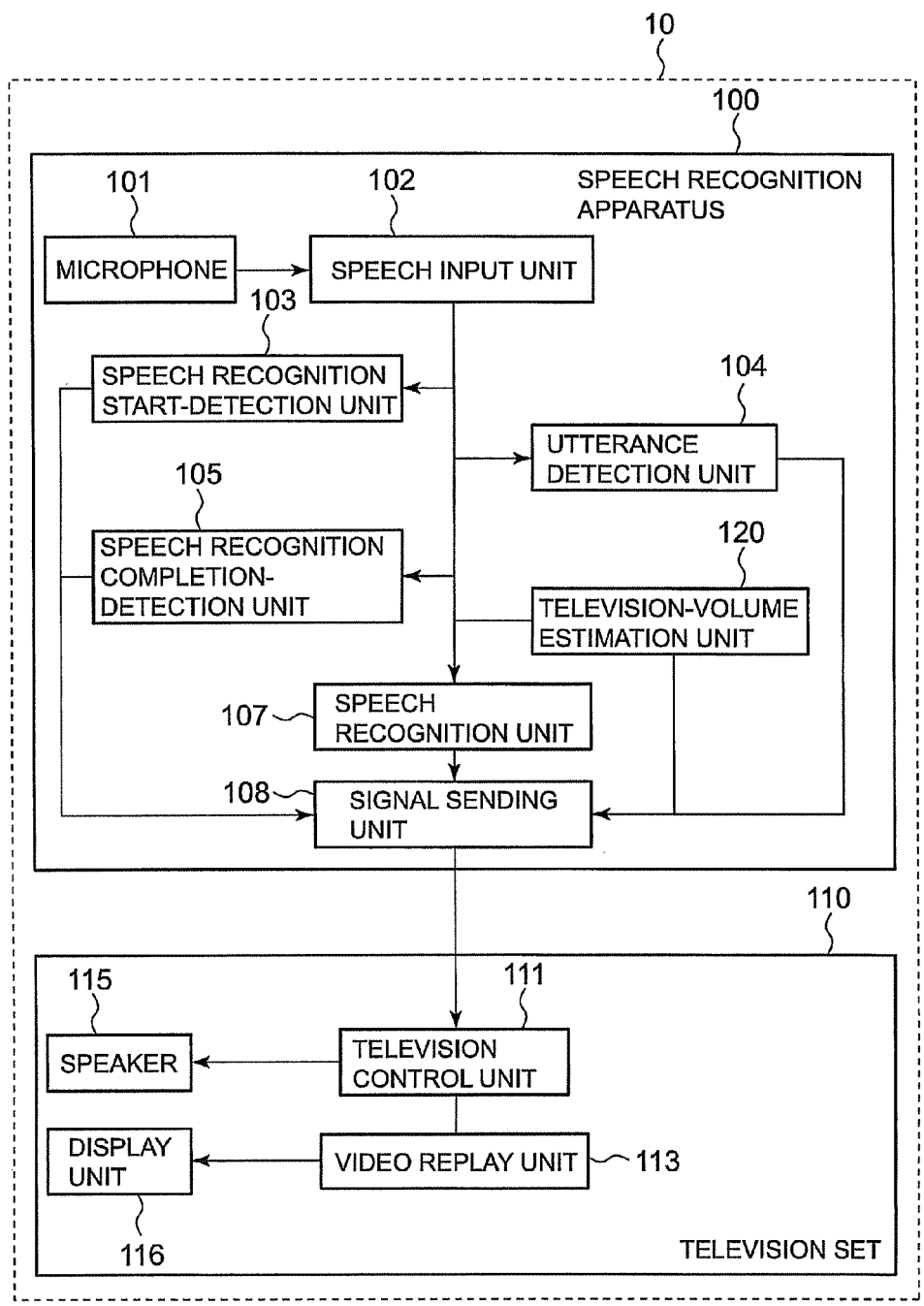
FIG. 16 is a block diagram of the television apparatus according to a third embodiment.
Figure 17:
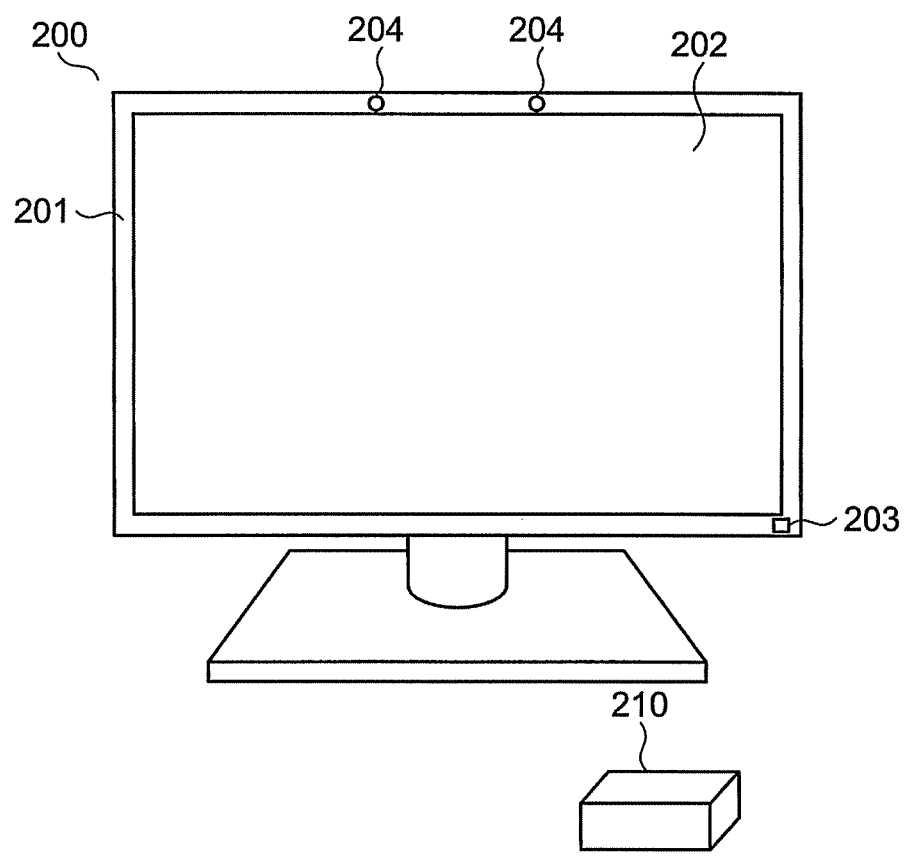
FIG. 17 is a schematic diagram of one example of an appearance of the television apparatus according to the third embodiment.

FIG. 16 is a block diagram of the speech recognition apparatus 100 and the television set 110 according to the third embodiment. FIG. 17 is one example of appearance of the speech recognition apparatus 100 and the television set 110 according to the third embodiment.

As shown in FIG. 17, the speech recognition apparatus 100 (210) is remotely located from the television set 110 (200). In the third embodiment, the speech recognition apparatus 100 is a remote controller device (remote commander) to operate the television set 110 from a remote place. The speech recognition apparatus 100 sends an operation command to the television set 110 wirelessly (For example, an infrared ray pulse or an electric wave).

In the third embodiment, in order to estimate an ambient sound at a position where the speech recognition apparatus 100 is located, the speech recognition apparatus 100 includes a television-volume estimation unit 120. The television-volume estimation unit 120 estimates a television-volume from an averaged volume of the ambient sound inputted for a past predetermined period by the speech input unit 102.

The signal sending unit 108 changes a volume-level of the television set 110 during the speech recognition, based on the television-volume estimated by the television-volume estimation unit 120. Briefly, based on the volume-level estimated, the signal sending unit 108 calculates a volume-level during the speech recognition. As a correspondence relationship between the volume level estimated and the volume level during the speech recognition, for example, setting examples shown in FIGS. 7, 8, 9 and 10 are used. Naturally, another setting example may be used.

The signal sending unit 108 sends an operation command to set the volume level (calculated) to the television set 110. The signal sending unit 108 may repeatedly send an operation command to lower the volume-level, and may send an operation command (direct code) to directly indicate a value of the volume level. Furthermore, the signal sending unit 108 may send a special operation command to set the volume level to a half value (½ mute). Only if the volume level used during the speech recognition is lower than a specific level, another operation command may be sent.

Figure 18:
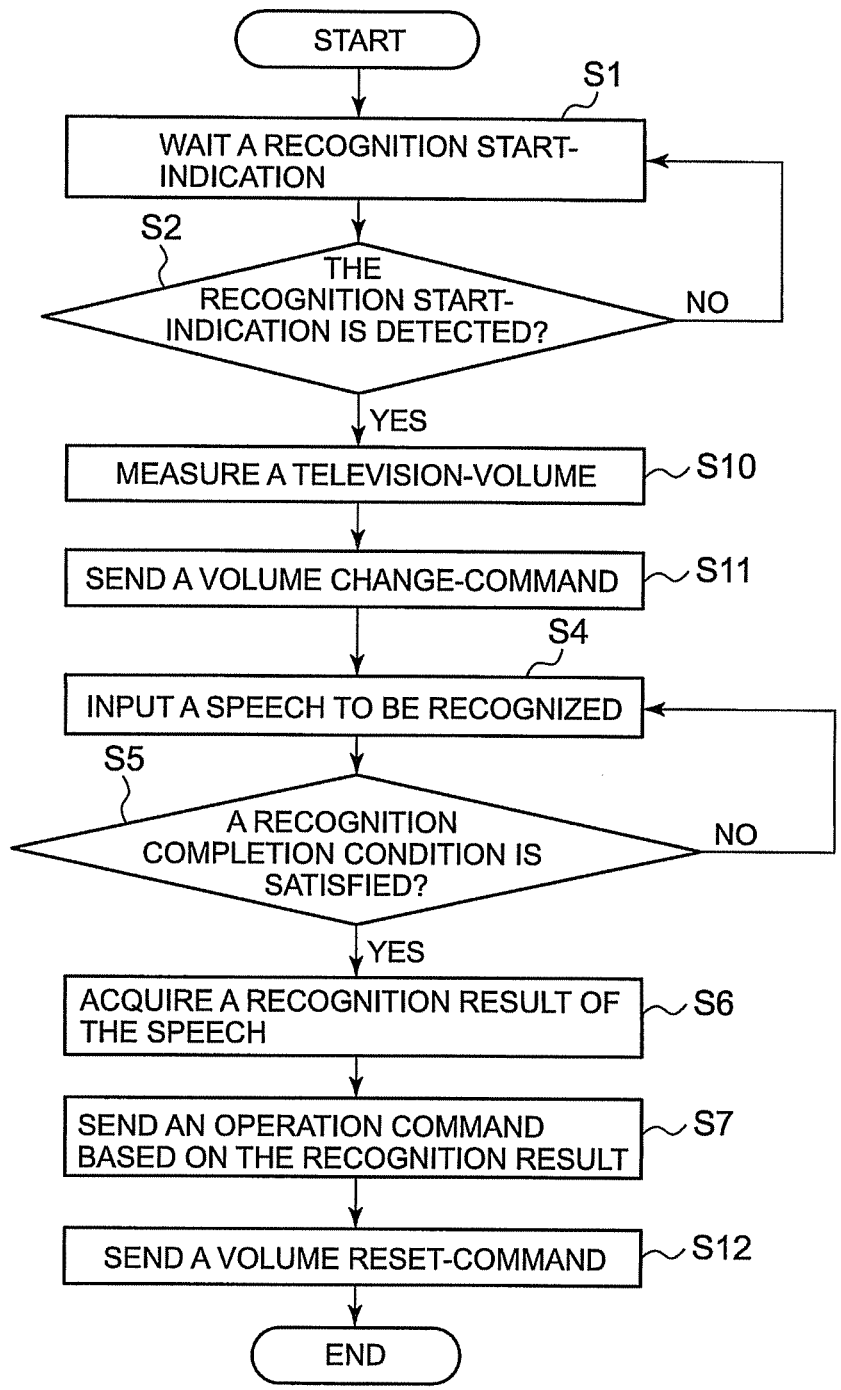
FIG. 18 is a flow chart of processing of the speech recognition apparatus 100 according to the third embodiment.
Figure 19:
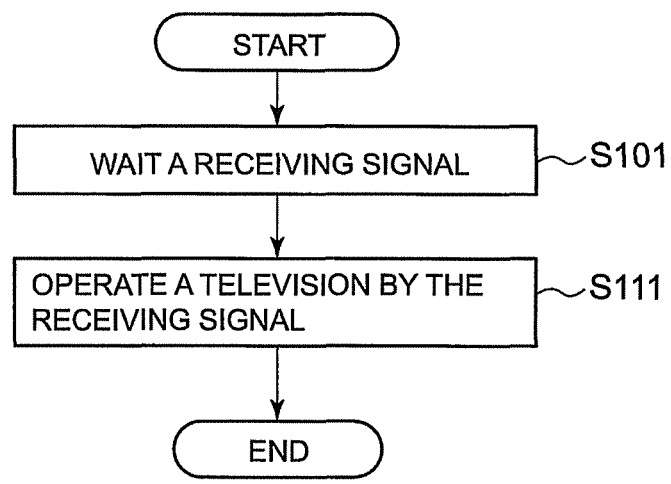
FIG. 19 is a flow chart of processing of the television set 110 according to the third embodiment.

FIG. 18 is a flow chart of processing of the speech recognition apparatus 100 of the third embodiment. FIG. 19 is a flow chart of processing of the television set 110 of the third embodiment.

When the speech recognition start-detection unit 103 detects the speech recognition start, the television-volume estimation unit 120 estimates a television-volume from an averaged volume of the ambient sound inputted for a past predetermined period by the speech input unit 102 (S10). Based on the television-volume, the signal sending unit 108 sends an operation command to change the television volume during the speech recognition (S11). After that, the speech recognition unit 107 recognizes a speech, and acquires a recognition result of the speech (S4, S5, S6). The signal sending unit 108 sends an operation command based on the recognition result (S7). After that, the signal sending unit 108 sends an operation command (such as a mute release command) to reset the volume to a value prior to the speech recognition (S12).

As mentioned-above, in the third embodiment, a television-volume during the speech recognition is controlled based on a television-volume measured by the speech recognition unit 107. As a result, the television-volume can be controlled within a range necessary for the speech recognition.

The Fourth Embodiment

The television apparatus of the fourth embodiment is explained by referring to Figs. As to the same processing/component as the first, second and third embodiments, the same sign is assigned and explanation thereof is omitted. Parts different from the first, second and third embodiments are only explained.

Figure 20:
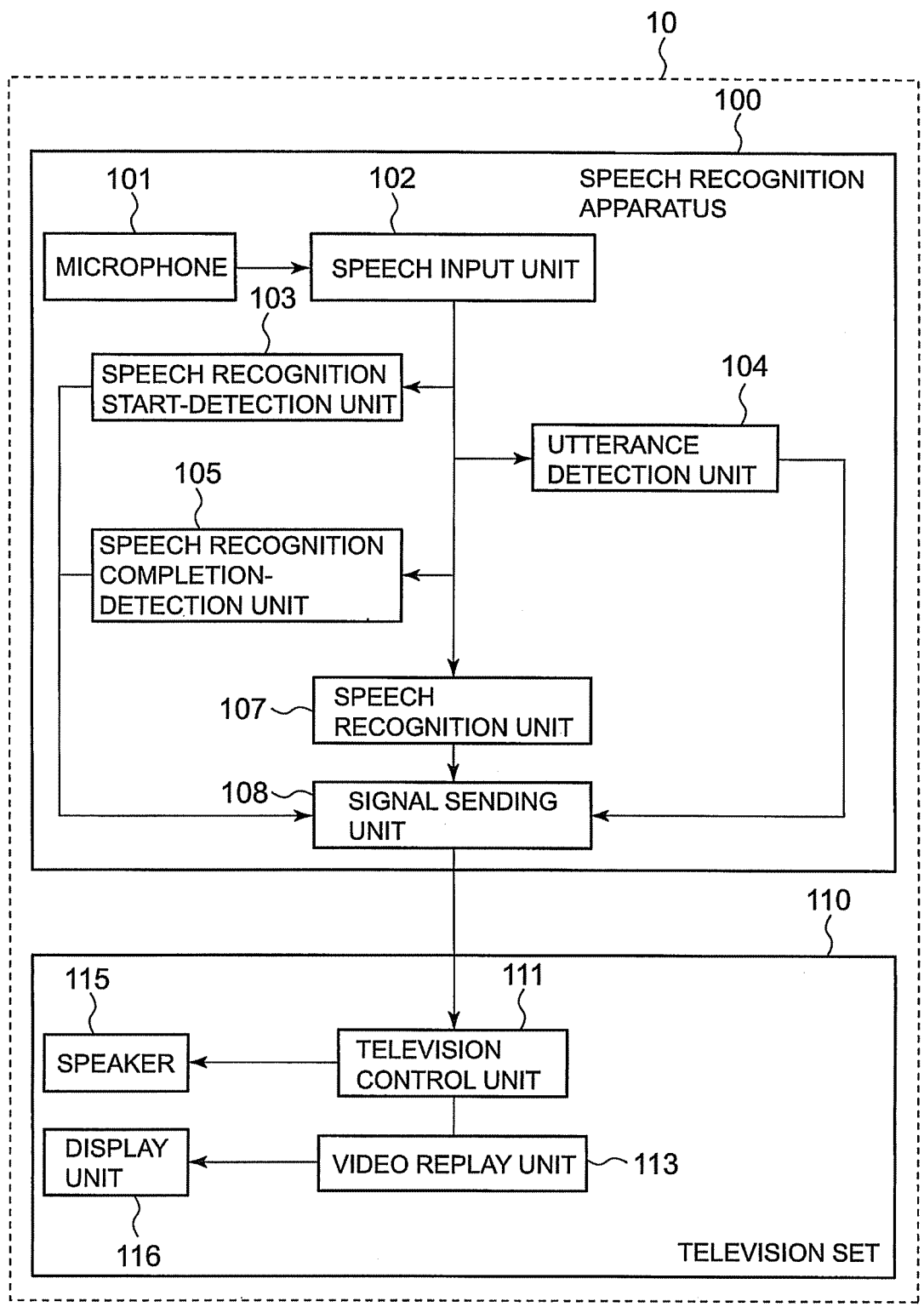
FIG. 20 is a block diagram of the television apparatus according to a fourth embodiment.

FIG. 20 is a block diagram of the television apparatus 10 of the fourth embodiment. In the fourth embodiment, the television apparatus 10 includes the speech recognition apparatus 100 and the television set 110. The speech recognition apparatus 100 includes a microphone 101, a speech input unit 102, a speech recognition start-detection unit 103, an utterance detection unit 104, a speech recognition completion-detection unit 105, a speech recognition unit 107, and a signal sending unit 108. The television set 110 includes a television control unit 111, a video replay unit 113, a speaker 115, and a display unit 116.

Figure 21:
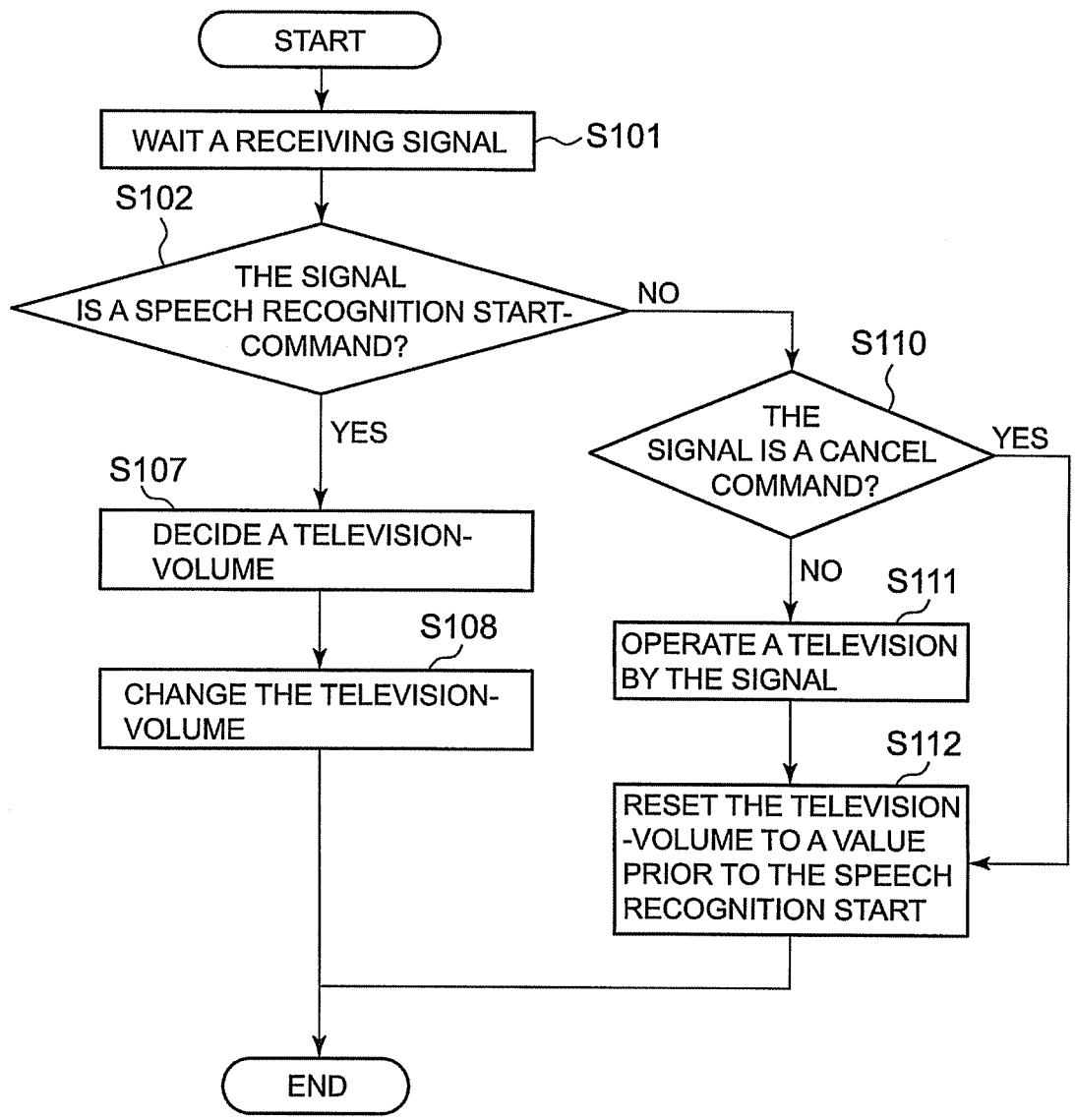
FIG. 21 is a flow chart of processing of the television set 110 according to the fourth embodiment.

FIG. 21 is a flow chart of processing of the television set 110 of the fourth embodiment. In the fourth embodiment, when the stored content is viewed or when the broadcast content is viewed, the television set 110 controls the television-volume after receiving the speech recognition start-command (S107, S108).

As mentioned-above, in the television apparatus of the fourth embodiment, based on a television-volume prior to the speech recognition start, the television-volume during speech recognition processing is temporarily controlled. As a result, while the speech recognition is accurately executed with little calculation load, disturbance of viewing by the speech operation is avoided.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television apparatus comprising:
a speech input unit configured to input a speech;
an indication input unit configured to input an indication to start a speech recognition from a user;
a speech recognition unit configured to recognize the user's speech inputted after the indication is inputted;
a control unit configured to execute an operation command corresponding to a recognition result of the user's speech;
a recording unit configured to acquire a recorded content by recording a broadcast program being broadcasted; and
a replay unit configured to replay the broadcast program or the recorded content;
wherein the replay unit decides whether a content being replayed is the broadcast program at a timing when the indication is inputted,
wherein the control unit, if the content is the broadcast program, and if a volume of the television apparatus at the timing is larger than or equal to a threshold, temporarily sets the volume to a value smaller than the threshold while the speech recognition unit is recognizing,
wherein the recording unit starts to record the broadcast program, when the volume is set to the value smaller than the threshold while the broadcast program is being replayed, and
wherein the replay unit replays the recorded content by chasing playback from the timing and by resetting the volume to a value prior to the speech recognition indication during the playback, after the speech recognition is completed and if the operation command is not channel-change of broadcasting wave, and discards the recorded content if the operation command is channel-change of broadcasting wave.

2. The television apparatus according to claim 1,
wherein the replay unit replays a stored content recorded in a recording medium; and
when the indication is inputted during replaying the stored content, temporarily stops replay of the stored content while the speech recognition unit is recognizing.

3. The television apparatus according to claim 1, wherein the control unit resets the volume to a value prior to the timing, if the recognition result is a specific one.

4. The television apparatus according to claim 1, further comprising:
an utterance detection unit configured to detect the user's utterance;
wherein the control unit displays a rest time to pass a predetermined time from the timing, and resets the volume to a value prior to the timing, if the user's utterance is not detected in the predetermined time from the timing.

5. The television apparatus according to claim 1, further comprising:
an echo canceller configured to cancel an output sound of the television apparatus from an input sound of the speech input unit; and
a calculation resource-monitor unit configured to monitor a calculation resource of a main processor of the television apparatus;
wherein the control unit switches control processing of the volume and echo cancel processing by the echo canceller, based on the calculation resource at the timing.

6. A method for controlling a television apparatus, comprising:
replaying a broadcast program being broadcasted or a recorded broadcast program;
inputting a speech;
inputting an indication to start a speech recognition from a user;
recognizing the user's speech inputted after the indication is inputted;
executing an operation command corresponding to a recognition result of the user's speech;
deciding whether a content being replayed is the broadcast program at a timing when the indication is inputted;
if the content is the broadcast program, and if a volume of the television apparatus at the timing is larger than or equal to a threshold, temporarily setting the volume to a value smaller than the threshold while the user's speech is being recognized;
starting to record the broadcast program, when the volume is set to the value smaller than the threshold while the broadcast program is being replayed;
replaying the recorded broadcast program by chasing playback from the timing and by resetting the volume to a value prior to the speech recognition indication during the playback, after the speech recognition is completed and if the operation command is not channel-change of broadcasting wave; and
discarding the recorded broadcast program if the operation command is channel-change of broadcasting wave.

* * * * *